(No Model.)

J. MURPHY.
BELTING.

No. 284,221.  Patented Sept. 4, 1883.

WITNESSES
Wm A. Skinkle
W. T. Robertson

INVENTOR
John Murphy
By his Attorneys
Gifford & Gifford

UNITED STATES PATENT OFFICE.

JOHN MURPHY, OF BROOKLYN, NEW YORK.

BELTING.

SPECIFICATION forming part of Letters Patent No. 284,221, dated September 4, 1883.

Application filed April 27, 1883. (No model.)

*To all whom it may concern:*

Be it known that I, JOHN MURPHY, a citizen of the United States, residing at Brooklyn, in the county of Kings and State of New York, have invented certain new and useful Improvements in Belting, of which the following is a specification, reference being had therein to the accompanying drawings.

Heretofore it has been customary to manufacture belting of fibrous material, preferably duck, which is united in layers by rubber or gutta-percha pressed by rolls covered by an outer coating of rubber, and then vulcanized. In the use of this belting it has been found that (especially where the speed attained is very high, and in places where it is exposed to the weather) there is a constant tendency of the layers of fibrous material to become separated from each other, which results in the partial or complete destruction of the utility of the belt. To obviate this difficulty the various layers of duck, after being coated with rubber and pressed together, have sometimes been re-enforced by a continuous longitudinal row or rows of stitching; but the difficulty with this method has been that when the belt was stretched, which was sometimes done in the manufacture and sometimes occurred when the belt was in use, the thread or cord forming the sewing would not stand the strain and would be broken in places where it passed through the material of the belt. This left nothing at the places where the breaking of the thread occurred to unite the layers of duck, excepting the adhesive qualities of the rubber.

My improvement consists in uniting or staying the various layers of belt by a series of separate flexible stays, which may be formed of a row or rows of stitching, which stitching is, during the manufacture of the article, intentionally cut at frequent intervals intermediate the points where the thread forming the stitching passes through the material. This breaks the continuity of the thread at places removed from places where it passes through the material, so that its function of uniting or staying the various layers of the belting is not practically lessened, while the thread may be severed at sufficiently frequent intervals to prevent strain being brought upon it where it passes through the belt by the stretching of the belt.

Figure 1:
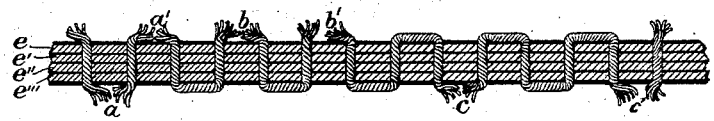
Figure 2:
Figure 3:
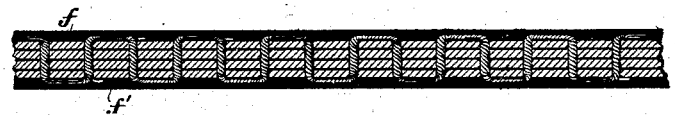

In the drawings, Figure 1 represents four layers of duck externally coated with rubber, as they appear after the stitching has been applied and cut, *a a'* representing the stitches as cut between each passage through the material, *b b'* representing the stitches as cut between every other passage through the material, *c c'* representing the stitches as cut between every fourth passage through the material. The coating of rubber intervenes between the layers of duck and covers the exterior. Fig. 2 represents the same thing as Fig. 1 after it has undergone the pressure between rolls which embeds the stitches or stays in the coating of rubber which covers the exterior of the duck. Fig. 3 represents the completed belt as it appears after the thing shown in Fig. 2 has been enveloped in the final covering of rubber and the whole has been vulcanized.

I will now proceed to describe more fully the manner in which I prefer to manufacture my improved belting.

I first take sufficient fibrous material of the kind which is ordinarily used in manufacturing belting—as, for instance, duck—and having properly coated it on each side with rubber, I cut it into strips sufficient to form the number of layers which it is desired the belt should contain. These layers are placed together in the ordinary manner and powerfully compressed between rolls, so that the various layers are made to adhere by the coating of rubber which they have received. I then sew these layers together by as many lines of stitching running longitudinally of the belt as may be desired, the material used for sewing being preferably cotton cord coated by or run through a solution of rubber or rubber cement, though other flexible material may be employed. The coating, among other beneficial properties, tends to lubricate the needle in case a machine is used in applying the cord, and, when vulcanized, forms an additional means of holding the stays in place. I then cut the stitches between the places where they pass through the material. Sometimes I cut the cord forming the stitching between each passage through the material, and this is the method that I prefer; but it will be found sufficient in many instances to cut the stitching less frequently—as, for instance, between every other, or every third, or every fourth passage through the material, as illustrated in Fig. 1. When the cord has been thus cut, the cut ends will project outward loosely from the surface of the material, as shown in Fig. 1, and the cut ends are preferably again thoroughly coated with a coating of rubber solution or rubber cement. The layers of duck are shown at $e, e', e'',$ and $e'''$. I next take the article shown in Fig. 1 and pass it between rollers, where it is again strongly compressed, and where the projecting ends of the stays shown in Fig. 1 are pressed down and embedded in the rubber coating of the duck, as shown in Fig. 2. The next thing which is done is to place upon the exterior of the article shown in Fig. 2 the usual envelope of rubber in the ordinary manner. When this has been accomplished, the article produced is preferably stretched longitudinally before it is vulcanized. This stretching, where the thread of the stitching was continuous, as heretofore, was liable to break the thread in the manner I have described; but with my improvement the stretching may be accomplished without detriment to the stays. When the belt is thus stretched, I vulcanize it in the ordinary manner, and it is then ready for use in the condition shown in Fig. 3. The ends of the stitches are held securely in place by the rubber, which is made firm by vulcanization, so that the stitches constitute secure stays against any tendency of the layers of the belt to separate. At the same time there is no liability of the stitches becoming broken or displaced between the layers of the belt by any stretching of the belt.

I have described the flexible stays $a\ a', b\ b',$ &c., which unite or stay the layers of the belt, as being applied by sewing before being separated; but my invention is not limited to the manner in which they are applied. The flexible stays might be cut into the required lengths before being applied to the belt, and they might be placed in position by any convenient means.

I have shown in the drawings, for convenience of illustration, what is known ordinarily as the "running stitch;" but it is obvious that machine-stitching may be used, as before mentioned.

I claim—

1. The improvement in the method of manufacturing vulcanized belting containing several layers of fibrous material, which consists in uniting said layers by a series of flexible stays disconnected from each other at frequent intervals and applied before vulcanization, substantially as described.

2. In combination with the several layers of a belt, a series of flexible stays disconnected from each other at frequent intervals and held in position by the vulcanized material, substantially as described, whereby the separation of said layers is prevented and the condition of the belt is not injured by stretching.

In testimony whereof I affix my signature in presence of two witnesses.

JOHN MURPHY.

Witnesses:
 DANIEL H. DRISCOLL,
 A. SPADON.